United States Patent
Uesugi

[15] 3,706,269
[45] Dec. 19, 1972

[54] AUTOMATIC DIAPHRAGM DEVICE FOR INTERCHANGEABLE LENS FOR SINGLE LENS REFLEX CAMERA

[72] Inventor: Kyozo Uesugi, Osaka Prefecture, Japan

[73] Assignee: Minolta Camera Kabushiki Kaisha, Minamiku, Osaka, Japan

[22] Filed: March 15, 1971

[21] Appl. No.: 124,131

[30] Foreign Application Priority Data

April 2, 1970 Japan..................45/32443

[52] U.S. Cl. ..................................95/64 B
[51] Int. Cl. ..................................G03b 9/07
[58] Field of Search..................95/64, 64 B

[56] References Cited
UNITED STATES PATENTS 3,165,997  1/1965  Sugano..................95/64 B
3,447,431  6/1969  Kiper..................95/64 B X
3,489,071  1/1970  Mohr..................95/64 B Primary Examiner—Samuel S. Matthews
Assistant Examiner—Michael Harris
Attorney—Stanley Wolder

[57] ABSTRACT

A rod 24 pivots inside a lens barrel. Movement of level 1 by depressing the shutter release allows link 20 to pivot. Pin 22, fixed on the link drives lever 26 to pivot rod 24. Lever 27 slides along rod 24 as the lens is extended but is fixed to move pivotably with the rod. to drive a second link 32. The diaphragm blades are mounted on ring 34 which is rotated by the second link 32 through pin 35. Cam 41 limits the travel of link 32 in accordance with the pre-set f-stop.

3 Claims, 7 Drawing Figures

Inventor
KYOZO UESUGI
By *Stanley Wolder*
Attorney

AUTOMATIC DIAPHRAGM DEVICE FOR INTERCHANGEABLE LENS FOR SINGLE LENS REFLEX CAMERA

BACKGROUND OF THE INVENTION

The present invention relates to an automatic diaphragm device for interchangeable lenses for single lens reflex cameras, more particularly to an automatic diaphragm device suitable for automatically operating the diaphragm for interchangeable lenses such as long-focus macro lens, telephoto lens and the like.

Various automatic diaphragm devices have heretofore been proposed for use with interchangeable lenses for single lens reflex cameras. However, it has been very difficult or impossible to employ these known automatic diaphragm devices for lenses, such as super-telephoto lens and macro lens of the usual type, which require a large amount of focusing travel and which incorporate a diaphragm between constituent lenses. This will be readily understood from the fact that among the interchangeable lenses commercially available for 35 mm single lens reflex cameras, none of long-focus macro lenses and super-telephoto lenses having a focal length in excess of 300 mm are equipped with a full automatic diaphragm device. A more detailed explanation will be given below with reference to FIG. 1 in which an example of known devices is shown.

In FIG. 1, designated at 1 is a lever of the automatic diaphragm mechanism in the camera body, which lever is adapted to be retracted in the direction of an arrow $a$ in the figure when an unillustrated shutter button on the camera is depressed. The lever 1 is then returned in the opposite direction upon completion of travel of a second curtain of the shutter. A first arcuate lever 2 is pivoted, at a hole 5, to an unillustrated outer cylinder of a lens barrel and urged toward the direction of an arrow $b$ by a spring 6, a pin 3 on the lever 2 being adapted to follow the lever 1. Accordingly, when the lever 1 is retracted toward the direction of the arrow $a$, the arcuate lever 2 is pivotally moved about the hole 5 in the direction of the arrow $b$. The first arcuate lever 2 is further provided with an interlocking pin 4.

On the other hand, a second arcuate lever 7 pivoted at a hole 8 to the inner cylinder (not shown) of the lens barrel is formed with grooves 9 and 13 at its free end. The pin 4 of the first arcuate lever 2 is in engagement with the first groove 9 and the second groove 13 receives therein a driven pin 12 extending from a diaphragm operating plate 11. The second arcuate lever 7 is further provided with a cam engaging pin 10 to be engaged with a diaphragm control cam 14 to be rotated and displaced integrally with an unillustrated diaphragm ring on the lens barrel. Consequently, the amount of rotation of the arcuate levers 2, 7 and the diaphragm operating plate 11 is controlled by the displacement of the diaphragm control cam 14.

The diaphragm operating plate 11 has a rivet 17 to be engaged in a slot 16 in each diaphragm blade 15, which is therefore moved pivotally inward about a pin 18 to define the lens aperture in accordance with the amount of rotation of the diaphragm operating plate 11. Upon completion of exposure, the lever 1 is returned to the original position, with other members also returned to the illustrated position to open out the diaphragm.

If such automatic diaphragm device is used for interchangeable lenses which require a large focusing travel, the focusing movement will produce objectionable results. More specifically, if the groove 9 of the second arcuate lever 7 is positioned approximately at the distal end (i.e., the left-hand end in FIG. 1) of the interlocking pin 4 as seen in FIG. 1, the length of the pin 4 is excessively great as compared with the radius of the pivotal movement of the pin 4 about the hole 5 and therefore a large bending moment acts on the base portion of the pin 4, with the result that the pin 4 and the first arcuate lever 2 are liable to be inclined or twisted, this giving rise to marked friction during operation to render the mechanism inoperative. Moreover, the pin 3 will no longer engage with the lever 1 at proper position. In order to eliminate these objections, the pivoted portion of the first arcuate lever 2 or the movable members may presumably be modified or reinforced, but such attempt will encounter the difficulty that the lens barrel becomes excessively large, the space available is insufficient, the parts become complex and expensive and increase in moment of inertia no longer permits high speed operation.

For these reasons, it has been impossible to provide a full automatic diaphragm device for use with interchangeable lenses which is adapted for a large amount of focusing travel. In fact, it has heretofore been infeasible to build such device for an interchangeable lens which has to be extended more than 25 mm for focusing.

SUMMARY OF THE INVENTION

An object of the present invention is to provide a full automatic diaphragm device capable of operating with high reliability and smoothness and adapted to be used for interchangeable lenses which require a large amount of focusing travel.

Another object of the present invention is to provide a full automatic diaphragm device of the type described in which moment of inertia due to high speed action to set the diaphragm for a desired aperture size is minimized without using especially reinforced and complex parts and mechanism.

Another object of the present invention is to provide a full automatic diaphragm device in which the diaphragm blades are prevented from reactive jumping movement when brought to a sudden halt even during high speed diaphragm setting action so as to eliminate irregular exposures due to the reactive movement.

The present invention is characterized by a structure comprising an interlocking rod disposed in parallel with the optical axis of the lens system and pivotally supported at its opposite ends on an outer cylinder of the lens barrel, a first lever fixedly mounted on one end of the interlocking rod for transmitting the movement of an operatively linked member on the lens barrel to the interlocking rod, and a second lever adapted to be slidably moved on the interlocking rod in accordance with the travel of an inner cylinder of the lens barrel and to be pivotally moved integrally with the interlocking rod so as to transmit the pivotal movement of the interlocking rod to a diaphragm blade operating member, the constituent operating members being so positioned that the operatively linked portion including the operatively linked member and the first lever and the operatively linked portion including the second lever and the diaphragm blade operating member ensure excellent stopping down action and minimize reactive jumping force when the stopping down action is brought to a halt.

Thus, the diaphragm blade operating member is driven by the operatively linked member on the lens barrel which follows the action of the automatic diaphragm actuating means on the camera body. In accordance with this invention, the interlocking rod, pivotally supported at its opposite ends on the outer cylinder of the lens barrel, is associated with the linked member for pivotal movement, through the first lever which follows the movement of the latter. Further, the second lever which serves to transmit this movement to the diaphragm blade operating member is slidably moved on the interlocking rod in accordance with the focusing travel of the inner cylinder of the lens barrel. Because of such construction, there is no need to mount an elongated interlocking pin on the operatively linked member unlike in a conventional device. Even when the second lever is positioned at the end of the interlocking rod, the linked member is free from objectionable bending moment. Accordingly, when applied to an interchangeable lens which is adapted for a large amount of focusing travel, the present device assures reliable high speed action of the operating members while minimizing the moment of inertia to be exerted when they are abruptly stopped from high speed action. It is therefore possible to apply the present invention to interchangeable lenses for 35 mm single reflex cameras which are adapted for a large amount of focusing travel, such as a super-telephoto lens having a focal length of 500 mm or 800 mm, a macro lens with a focal length of 100 mm, etc., whereby full automatic diaphragm function can be incorporated with a very simple and compact mechanism. In addition, even with an interchangeable lens having a focal length of 300 mm, this invention ensures photographing over a shorter distance than has heretofore been possible.

Since the operatively linked portions including the above-mentioned levers achieve more efficient stopping down action, with minimized reactive jumping force due to sudden stoppage of the diaphragm action, irregular exposures attributable to the reactive jumping force can be eliminated for accurate operation.

Other objects and features of this invention will become more apparent from the following description of an embodiment.

DESCRIPTION OF THE PREFERRED EMBODIMENT

Figure 3:
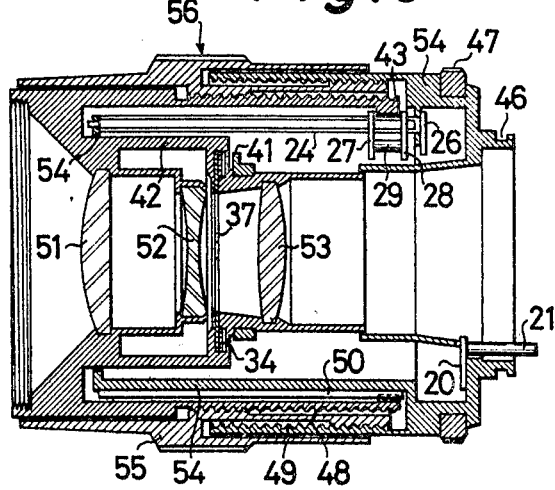
FIG. 3 is a view in vertical section showing a lens barrel to which this invention is applied.

With reference to FIG. 3, a lens barrel 56 comprises an outer cylinder 54 provided with a known lens mount 46 for mounting the lens barrel 56 on the camera body (not shown), an inner cylinder 42 equipped with taking lenses 51, 52, 53 disposed in optical arrangement and a focusing ring 55 associating the inner cylinder 42 with the outer cylinder 54 by means of two helical threads 48 and 49 for focusing. The inner cylinder 42 and the outer cylinder 54 are in engagement with a key 50, so that when the focusing ring 55 is rotated, the inner cylinder 42 can be advanced straightly. Further rotatably mounted on the outer cylinder 54 is a diaphragm ring 47 which, when rotated, turns a diaphragm control cam 41 and determines the diaphragm aperture size to be defined by diaphragm blades 37 by stopping down action which will be described later.

Figure 1:
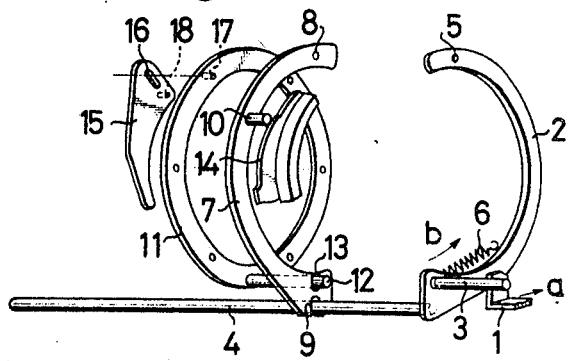
FIG. 1 is a perspective view showing the principal part of an example of the known automatic diaphragm device for an interchangeable lens.
Figure 2:
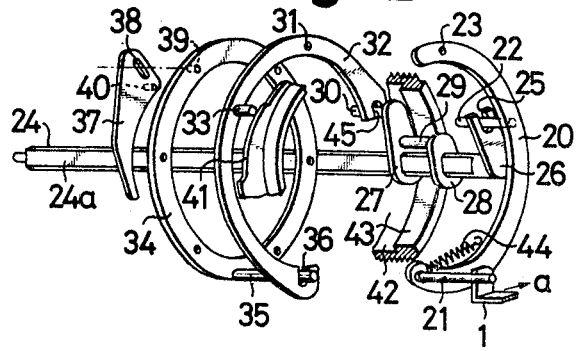
FIG. 2 is a perspective view showing the principal part of an embodiment of the present invention.

Referring to FIG. 2, a first arcuate lever 20 disposed within the outer cylinder 54 has pins 21, 22 and a pivot hole 23 and is mounted, at its one end, on the outer cylinder 54 by an unillustrated pivot which extends through the hole 23. The pin 21, extending from the free end of the first arcuate lever 20, is urged into contact with a lever 1 of unillustrated automatic diaphragm actuating means in the camera body, under the action of a spring 44 acting on the first arcuate lever 20. The lever 1 is adapted to be moved in the direction of an arrow $a$ in the figure upon shutter release and to be returned to the original position by the actuating means upon completion of travel of the second curtain of the shutter. The pin 21 follows this movement and the first arcuate lever 20 is consequently moved pivotally back and forth. Thus, the first arcuate lever 20, pins 21, 22 thereon and spring 44 constitute an operatively linked member.

A interlocking rod 24 is rotatably supported, at its opposite end portions, on the outer cylinder 54 and disposed in parallel to the optical axis of the lens system. The rod 24 has, on the opposite sides, flat faces 24a which are parallel to its axis and is provided, at its one end, with a first lever 26 formed with a groove 25 in engagement with the pin 22 on the first arcuate lever 20, the arrangement being such that the reciprocal pivotal movement of the first arcuate lever 20 causes the interlocking rod 24 to move also pivotally back and forth. The interlocking rod 24 further carries a second lever 27 which is free to slide thereon in the axial direction but which can be moved together with the rod 24 in the direction of pivotal movement. The second lever 27 and a guide member 28 are connected together by a pin 29, and disposed between the lever 27 and the guide member 28 is the inner flange 43 of the inner cylinder 42 which moves the second lever 27 and the guide member 28 along the rod 24 when the inner cylinder 42 is extended outward. A pin 30 is secured to the second lever 27.

A second arcuate lever 32, pivotally mounted on the inner cylinder 42 by an unillustrated pivot extending through a hole 31, has a groove 45 formed at the end of its extension. Engaged in the groove 45 is the pin 30 on the second lever 27, which therefore brings the second arcuate lever 32 into operatively associated relationship with the first arcuate lever 20 for reciprocal pivotal movement by way of the interlocking rod 24. The second arcuate lever 32 further has a cam engaging pin 33 and a groove 36 reciving therein a pin 35 fixed to a diaphragm operating plate 34.

The diaphragm operating plate 34 is provided with rivets 39 which are engaged in slots 38 in diaphragm blades 37 and identical therewith in number. Each of the diaphragm blades 37 has a rivet 40 about which the blade is pivotally moved for stopping down. This stopping down action is effected by the diaphragm operating plate 34 which is rotated by the second arcuate lever 32 when it is pivotally moved.

The cam engaging pin 33 is disposed close to the periphery of a diaphragm control cam 41 whose amount of rotation is controlled by the diaphragm ring 47. Thus, the amount of the pivotal movement of the first and second arcuate levers 20 and 32 is governed as desired to determine the size of the diaphragm aperture when the diaphragm blades 37 are moved for stopping down.

When the shutter button is depressed, the automatic diaphragm actuating means in the camera body is operated to retract the lever 1 in the direction of the arrow $a$ in FIG. 2, whereupon the arcuate lever 20 is moved in a counterclockwise direction at a high speed under the action of the spring 44 and, at the same time, the pin 22 moves the interlocking rod 24 in a clockwise direction. The clockwise rotation of the rod 24 further causes the second lever 27 to move in a clockwise direction and the second arcuate lever 32 to move in a counterclockwise direction. As a result, the diaphragm operating plate 34 associated therewith is also moved in a counterclockwise direction to close the diaphragm blades 37 inward until the cam engaging pin 33 is brought into contact with the diaphragm control cam 41, when the movement of the operating members on the lens barrel is brought to a halt. The diaphragm blades 37 thus define an aperture corresponding to the desired diaphragm aperture value set by the diaphragm ring 47.

Upon completion of exposure, i.e., upon completion of travel of the second curtain of the shutter, the lever 1 returns to the original position, causing, by way of the pin 21, the above-mentioned operating members to move back to the original position shown in FIG. 2 against the action of the spring 44. The diaphragm is therefore opened out.

Figures 4, 5:
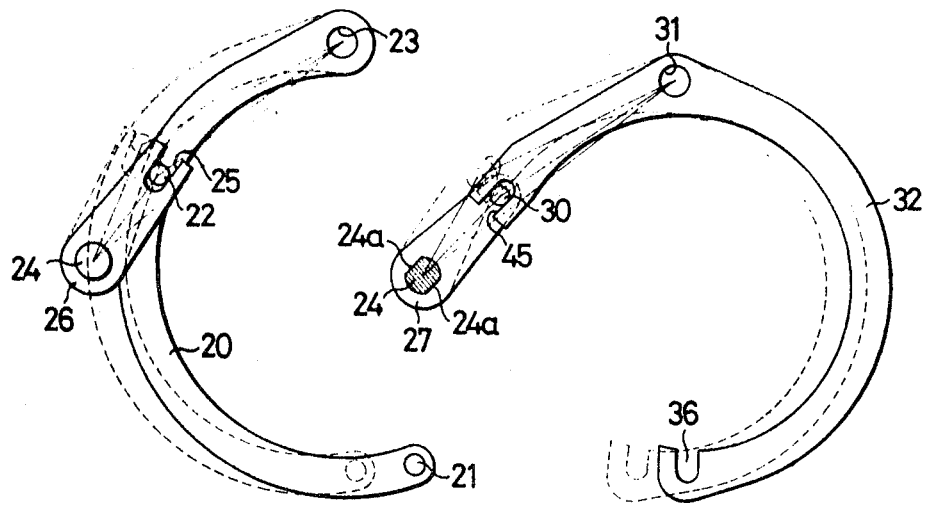
FIGS. 4 and 5 are front views of the principal part for illustrating the angular effect achieved by respective levers at the operatively linked portion.

Now the angular effect of the operatively linked portions in the above mechanism will be described. Referring to FIGS. 4 and 5 wherein solid lines indicate the positions of the operating members when the diaphragm is opened out and dotted lines, the positions of the members when the diaphragm is stopped down, it will be seen that a lever mechanism comprises a drive member provided with a pin on its acting portion and a driven member formed with a groove in which the pin is received and that the force vector of this mechanism is such that whereas stopping down can be achieved with case, the reactive jumping force produced upon setting of the diaphragm is least likely to cause instantaneous movement of the operating members in the opposite direction.

Figures 6, 7:
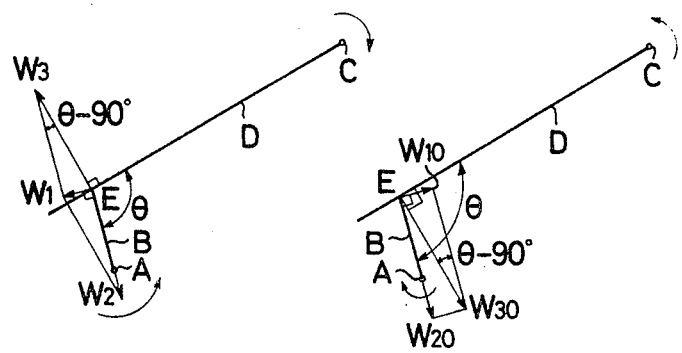
FIGS. 6 and 7 are diagrams illustrating the angular effect of the present invention.

For a better understanding, this will be described with reference to FIGS. 6 and 7. FIG. 6 is a diagram showing force vectors acting on the operating members when they are moved for stopping down and FIG. 7 shows the force vectors of the movement due to the reactive jumping force.

A drive lever B pivoted at A is in contact, at a point E, with a driven lever D which is pivoted at C, and when the lever B is rotated in a counterclockwise direction, the lever D is moved in a clockwise direction. As apparent from FIG. 6, the force $W_3$, a component of the drive force $W_1$ for rotating the lever D in a clockwise direction, is given by $$W_3 = W_1/\sin(\theta - 90°),$$ where $\theta$ is the angle defined by the intersecting levers B and D.

In FIG. 7, the force $W_{10}$, a component of the reactive jumping force $W_{30}$ for causing the lever B to rotate in a clockwise direction, is likewise given by $$W_{10} = W_{30} \cdot \sin(\theta - 90°).$$

Assuming $\theta = 135°$, $W_1 = 100$ g, and $W_{30} = 100$ g, the above equations give $$W_3 = 100/\sin 45° \approx 141 \text{ g, and}$$

$$W_{10} = 100 \times \sin 45° = 71 \text{ g},$$

hence $W_3 \gg W_{10}$. Thus, it will be apparent that in accordance with this invention the reactive jumping force due to sudden stoppage of stopping down action is very small and that irregular exposures can therefore be eliminated. Moreover, with the present invention, a structure having such excellent angular effect is employed at two operatively linked portions, namely, for the linkage of the first arcuate lever 20 and the first lever 26, and for the linkage of the second lever 27 and the second arcuate lever 32 so as to ensure efficient stopping down action and minimize the reactive jumping force.

The embodiment described above can be modified in various modes. Examples of modifications are a structure wherein the cam engaging pin above is associated with the diaphragm ring and the diaphragm control cam is mounted on the second arcuate lever; a structure wherein a square rod or spline shaft is substituted for the interlocking rod having planar opposite sides; a structure wherein the spring is mounted at a different position and the link portion comprises a pin and a lever in place of a pin and a groove; a structure including, in place of the guide member 28, the second lever 27 whose pivot hole portion is formed with a boss adapted to follow the focusing travel of the inner cylinder 42; a structure wherein O-shaped annular members are substituted for the first and second arcuate levers; a structure including a first arcuate lever of an overlapping construction for providing means for ascertaining the depth of focus of lens; etc. These modifications are to be included in this invention insofar as they are based on the principle of this invention. The present invention may of course be applied to interchangeable lenses adapted for a small amount of focusing travel.

I claim:

1. An automatic diaphragm setting device in an interchangeable objective lens including a lens barrel having an inner cylinder (42) and an outer cylinder (54) for a single lens reflex camera comprising:

an actuating member (1) movably supported by the body of said camera;

a link member (20) pivotally supported in said lens barrel;

a driving means (44) for urging said link member (20) to move in response to the movement of said actuating member (1);

a pin (22) positioned on said link member (20) and spaced from its pivot point;

a coupling rod (24) parallel with the optical axis of said objective lens with its opposite ends pivotally supported by said outer cylinder (54);

a first lever (26) having a recess (25) mounted on and rockable with said coupling rod (24), said recess (25) engaging said pin (22);

a second lever (27) mounted on said coupling rod (24) and axially slidable along and rockable with said coupling rod, said second lever being correspondingly longitudinally movable with the longitudinal movement of said inner cylinder;

a pin (30) positioned on said second lever (27);

a diaphragm actuating member (32) having a recess (45) engaging said pin (30); and an adjustable diaphragm including diaphragm blades (37) and a diaphragm adjusting ring (34) coupled to said diaphragm blades and connected to said diaphragm actuating member (32).

2. The automatic diaphragm setting device as set forth in claim 1, including a guide member (28) connected to and longitudinally spaced from said second lever (27), said inner cylinder (42) including an inwardly directed flange (43) situated between said second lever and said guide member.

3. The automatic diaphragm setting device as set forth in claim 1, wherein said interlocking rod has at least one flat face (24a) in parallel with the lens axis.

* * * * *